(12) United States Patent
Zhao

(10) Patent No.: US 12,547,579 B2
(45) Date of Patent: Feb. 10, 2026

(54) BOARD FOR CXL DATA TRANSMISSION, METHOD FOR DATA TRANSMISSION CONTROL AND DEVICE

(71) Applicant: SUZHOU METABRAIN INTELLIGENT TECHNOLOGY CO., LTD., Jiangsu (CN)

(72) Inventor: Jianjie Zhao, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/122,952

(22) PCT Filed: Mar. 21, 2024

(86) PCT No.: PCT/CN2024/083114
§ 371 (c)(1),
(2) Date: Apr. 21, 2025

(87) PCT Pub. No.: WO2025/001344
PCT Pub. Date: Jan. 2, 2025

(65) Prior Publication Data
US 2026/0010510 A1    Jan. 8, 2026

(30) Foreign Application Priority Data
Jun. 28, 2023    (CN) .......................... 202310776401.5

(51) Int. Cl.
*G06F 13/42*      (2006.01)
*H04L 49/111*     (2022.01)

(52) U.S. Cl.
CPC ........ *G06F 13/4291* (2013.01); *H04L 49/111* (2022.05); *G06F 2213/0026* (2013.01)

(58) Field of Classification Search
CPC ......... G06F 13/4291; G06F 2213/0026; H04L 49/111
See application file for complete search history.

(56) References Cited

U.S. PATENT DOCUMENTS 10,999,041 B2 *   5/2021   Lin ....................... H04L 1/1614
11,601,377 B1     3/2023   Kar
(Continued)

FOREIGN PATENT DOCUMENTS

CN      112597094 A       4/2021
CN      113742256 A      12/2021
(Continued)

OTHER PUBLICATIONS

Translation of ES-2773474-T3 (Year: 2020).*
(Continued)

*Primary Examiner* — Henry Tsai
*Assistant Examiner* — John B Roche
(74) *Attorney, Agent, or Firm* — Scully, Scott, Murphy & Presser, P.C.

(57) ABSTRACT

A board for CXL data transmission, a method for data transmission control and a device are provided. The board for CXL data transmission includes: a control chip, where the control chip is a chip that supports an open interconnection standard CXL protocol, and uplink ports and downlink ports are deployed on the control chip; the uplink ports, connected to a host, where the host is a device that supports a Peripheral Component Interconnect Express (PCIe) protocol or a device that supports the CXL protocol; and the downlink ports, connected to a processor at least one of and a memory module, where the downlink ports are correspondingly connected to the uplink ports, and the host is configured to transmit data to the corresponding downlink ports through the uplink ports, to transmit the data to the
(Continued)

processor at least one of and the memory module through the downlink ports.

20 Claims, 7 Drawing Sheets

(56) References Cited

U.S. PATENT DOCUMENTS

| | | | |
|---|---|---|---|
| 2020/0077427 A1* | 3/2020 | Li | ........................ H04L 1/0067 |
| 2021/0311897 A1 | 10/2021 | Malladi | |
| 2023/0029026 A1 | 1/2023 | Guim Bernat | |

FOREIGN PATENT DOCUMENTS

| | | |
|---|---|---|
| CN | 215769533 U | 2/2022 |
| CN | 115858146 A | 3/2023 |
| CN | 115904714 A | 4/2023 |
| CN | 115934366 A | 4/2023 |
| CN | 115982078 A | 4/2023 |
| CN | 116126742 A | 5/2023 |
| CN | 116166434 A | 5/2023 |
| CN | 116501681 A | 7/2023 |
| ES | 2773474 T3 * | 7/2020 ............ H04W 72/51 |
| JP | 5426028 B2 * | 2/2014 ........... H04L 1/1621 |

OTHER PUBLICATIONS

Translation of JP-5426028-B2 (Year: 2014).*
The first search report of CN application No. 202310776401.5 issued on Aug. 1, 2023, 9 pages.
The search report of PCT application No. PCT/CN2024/083114 issued on May 26, 2024, 4 pages.
The first office action of CN application No. 202310776401.5 issued on Aug. 2, 2023, 12 pages.

* cited by examiner

BOARD FOR CXL DATA TRANSMISSION, METHOD FOR DATA TRANSMISSION CONTROL AND DEVICE

CROSS-REFERENCE TO RELATED APPLICATION

This application claims priority to Chinese Patent Application No. 202310776401.5, filed with the China National Intellectual Property Administration on Jun. 28, 2023, and entitled "BOARD FOR CXL DATA TRANSMISSION AND METHOD FOR DATA TRANSMISSION CONTROL", which is incorporated herein by reference in its entirety.

TECHNICAL FIELD

Embodiments of this application relate to the computer field, and in particular to a board for CXL data transmission, a method for data transmission control and a device.

BACKGROUND

With the development of cloud computing applications, informatization has gradually penetrated into various sectors of the society. People's daily work is increasingly conducted through network communication, leading to an explosive increase in network data volume. As a core device for processing and storing data, a server faces increasingly higher demands for performance and configuration. The development of a current server technology is facing a bottleneck in a memory architecture: the growth of memory channels can no longer keep up with the increase in the number of Central Processing Units (CPU) cores, resulting in a reduced memory bandwidth available per core, which limits processor performance.

Currently, the memory and the processor are tightly coupled, and the memory is always deployed within a server node. Memory costs account for a significant part of total server costs. However, in practice, the utilization efficiency of the memory is not optimal. Some memory space is never accessed, while some cold data is stored in other memory space, which is accessed infrequently. The memory in this part has not been capable of fully achieving its potential. The expansion of a Compute Express Link (CXL, an open interconnect standard) memory in related technologies does not allow for resource reallocation based on different workload.

This reveals a problem, in the related technologies, that resources cannot be dynamically reallocated based on different workload.

SUMMARY

Embodiments of this application provide a board for CXL data transmission, a method for data transmission control, and a device, to resolve at least a problem, in the related technologies, that resources cannot be dynamically reallocated based on different workload.

According to a first aspect, a board for CXL data transmission is provided, including: a control chip, where the control chip is a chip that supports an open interconnection standard CXL protocol, and uplink ports and downlink ports are deployed on the control chip; the uplink ports, connected to a host, where the host is a device that supports a Peripheral Component Interconnect Express (PCIe) protocol or a device that supports the CXL protocol; and the downlink ports, connected to at least one of a processor and a memory module, where the downlink ports are correspondingly connected to the uplink ports, and the host is configured to transmit data to the corresponding downlink ports through the uplink ports, to transmit the data to at least one of the processor and the memory module through the downlink ports, where both the processor and the memory module are devices supporting the PCIe protocol or the CXL protocol.

According to a second aspect, a method for data transmission control is provided, including: a data request sent by a host is received through an uplink port, where the data request includes data to be transmitted, and the host is a device supporting a PCIe protocol or supporting a CXL protocol; routing information of the host is looked up in a routing table in response to the data request; and the data is transmitted, based on the routing information, to at least one of a processor and a memory module connected to a downlink port corresponding to the uplink port, where the downlink port is correspondingly connected to the uplink port, and both the processor and the memory module are devices supporting the PCIe protocol or the CXL protocol.

According to a third aspect, a control system for link switching is provided, where the control system for link switching includes the above board for CXL data transmission.

According to a fourth aspect, a non-volatile-readable storage medium is further provided. The non-volatile-readable storage medium stores a computer program, and when the computer is set to run, the steps in any of the above method embodiments are performed.

According to a fifth aspect, an electronic device is further provided, including a memory and a processor. A computer program is stored in the memory, and the processor is configured to run the computer program, so that the steps in any of the above method embodiments are performed.

In this application, the control chip in the board for CXL data transmission is a chip that supports the CXL protocol, and the uplink ports and the downlink ports are deployed. The uplink ports are connected to the host. The host is a device that supports the PCIe protocol or the CXL protocol. The downlink ports are connected to at least one of the processor and the memory module, and the downlink ports are correspondingly connected to the uplink ports, so that the host can connect both the processor and the memory module, allowing for flexible allocation of the number of processors and the number of the memory modules according to actual needs. Therefore, a problem, in the related technologies, that resources cannot be dynamically reallocated based on different workload can be resolved, to achieve the effect of flexible allocation of the resources.

DETAILED DESCRIPTION OF EMBODIMENTS

Embodiments of this application are described in detail in the following with reference to the accompanying drawings by using embodiments.

It should be noted that, in the specification, claims, and the accompanying drawings of this application, the terms "first", "second", and the like are intended to distinguish similar objects but do not necessarily indicate a specific order or sequence.

Related technologies in this embodiment are explained below.

CXL (Compute Express Link), an open industry standard for high-bandwidth and low-latency device interconnection; which can be used to connect a CPU and a GPU, a memory, a SmartNIC, and other types of devices;

GPU, a Graphic Processing Unit;

CXL SW, a Compute Express Link switch; and

CPU, a Central Processing Unit.

Figure 1:
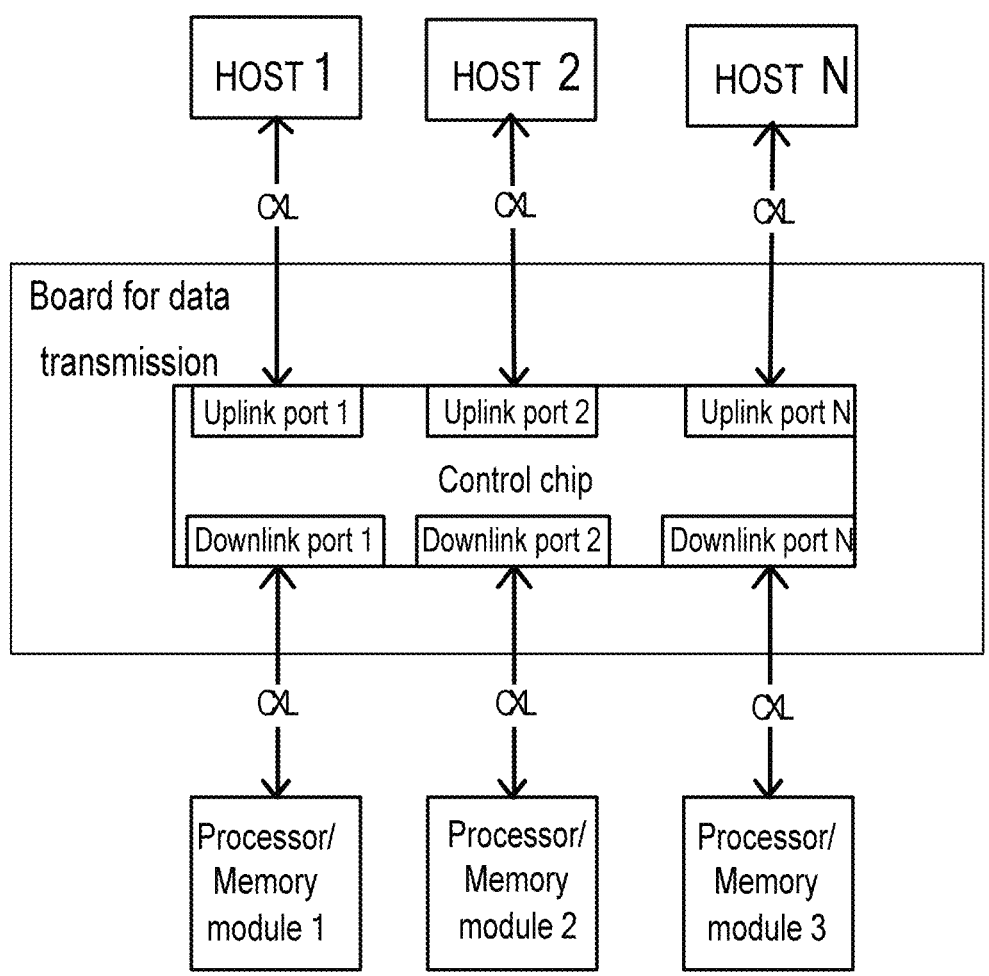
FIG. 1 is a schematic structural diagram of a board for CXL data transmission according to an embodiment of this application.

In this embodiment, a board for CXL data transmission is provided. FIG. 1 is a schematic structural diagram of a board for CXL data transmission according to an embodiment of this application. As shown in FIG. 1, the board for CXL data transmission includes:

a control chip, where the control chip is a chip that supports an open interconnection standard CXL protocol, and uplink ports and downlink ports are deployed on the control chip; the uplink ports, connected to a host, where the host is a device that supports a Peripheral Component Interconnect Express (PCIe) protocol or a device that supports the CXL protocol; and the downlink ports, connected to at least one of a processor and a memory module, where the downlink ports are correspondingly connected to the uplink ports, and the host is configured to transmit data to the corresponding downlink ports through the uplink ports, to transmit the data to at least one of the processor and the memory module through the downlink ports, where both the processor and the memory module are devices that support the PCIe protocol or the CXL protocol.

The board for CXL data transmission in this embodiment can be used in scenarios that require high-speed data transmission and large-scale data processing, such as a data center, high-performance computing, artificial intelligence cloud computing, and the like.

In this embodiment, the control chip is a chip that supports the CXL protocol, including a high-speed interconnect architecture CXL Switch Fabric. The CXL Switch Fabric can connect a plurality of CXL devices to form a computing platform for sharing resources. The CXL Switch Fabric provides a scalable and flexible infrastructure for the CXL devices, and a high-speed point-to-point connection is provided between the CXL devices, to implement communication and data transmission between the devices. The CXL devices may be hosts, processors, memory modules, and other devices.

In one embodiment, the CXL Switch Fabric architecture is divided into three layers: a transaction layer, a link layer, and a physical layer. To be compatible with both the PCIe protocol and the CXL protocol, a Flex Bus port is provided in the CXL Switch Fabric architecture, allowing a device to be selected from a PCIe device and a CXL device. A CXL.cache protocol and a CXL.mem protocol are combined to share a common transaction layer and a common link layer, while a CXL.io has its own transaction layer and link layer. The CXL link layer interacts with CXL ARB (Arbiter) or MUX (Multiplexer) to interweave traffic from two logical streams. The physical layer also includes two sublayers, namely a logical sublayer and an electrical sublayer. The logical sublayer can switch between a PCIe mode and a CXL mode, while the electrical sublayer follows a PCIe specification. In the transaction layer, the CXL.io provides an inconsistent load or storage interface for an I/O device.

Figure 2:
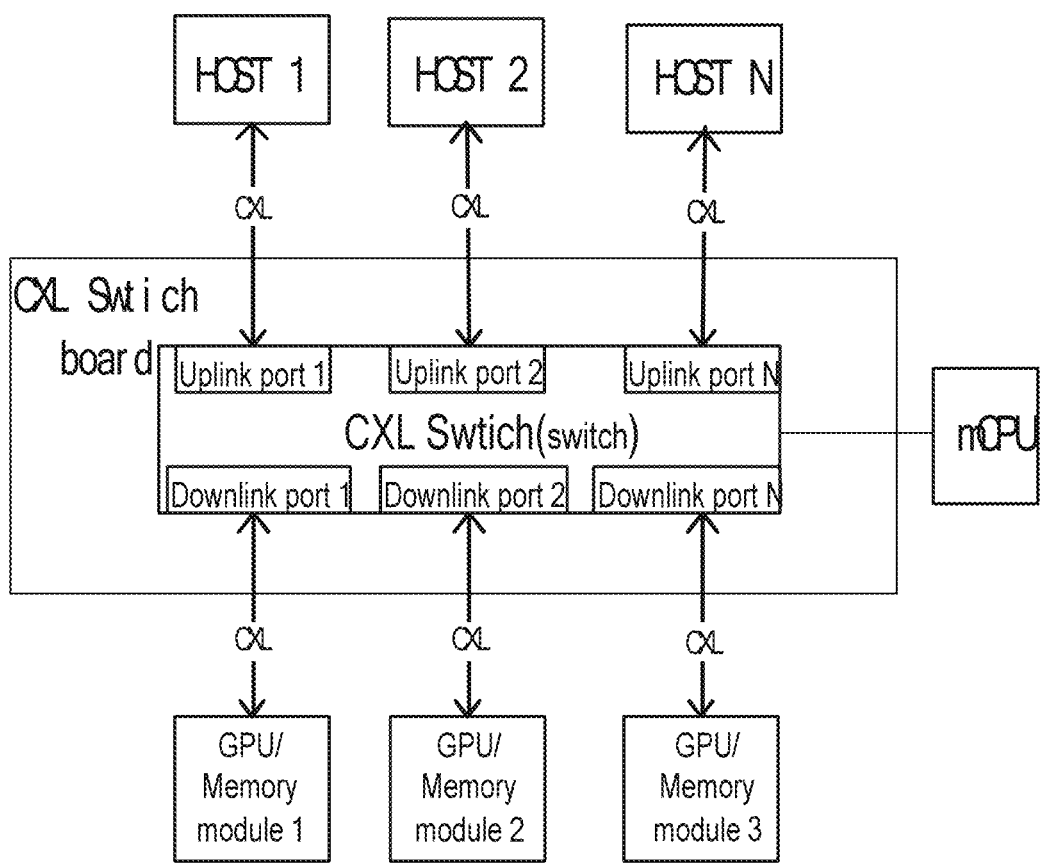
FIG. 2 is a schematic structural diagram of a board for CXL data transmission according to an embodiment of this application.

In one embodiment, the processor may be either a CPU or a GPU, and the CPU and GPU may not use the PCIe protocol and share each other's memory resources using the CXL protocol. Through the CXL protocol, the CPU and GPU are connected into one single massive stack memory pool. In this embodiment, a GPU BOX can support both a PCIe protocol and the CXL protocol. As shown in FIG. 2, the board for CXL data transmission may be a CXL Switch board, the control chip may be a CXL Switch chip, the processor may be a GPU, an uplink device may be connected to a plurality of HOSTs, and a downlink device may be connected to the GPU BOX or the memory module, which are flexibly configured. In addition, each host may be connected to different downlink devices, and a connection relationship between the host and the downlink device can be changed by changing programming information of the CXL Switch chip. The number of uplink devices and downlink devices connected can be determined by a function of the CXL Switch chip.

In one embodiment, when the downlink device is the GPU BOX, the GPU BOX supports 16 GPU slots, which are interconnected with the CXL Switch chip through CDFP cables, an onboard complex programmable logic device (CPLD) is configured to control power-on timing of the BOX, and an onboard bus master controller (BMC) is configured to manage a working state of the GPU.

In one embodiment, the memory module is a device based on the CXL bus protocol, which can implement remote expansion of the memory and memory sharing among a plurality of hosts. A CDFP interface of a memory board is interconnected with the CXL Switch board through a Coherent Drive Fiber-optic Interface (CDFP)cable. The onboard BMC and CPLD are responsible for management of a CXL Switch board, including heat dissipation control, power on/off, status indication, and the like.

In this application, the control chip in the board for CXL data transmission is a chip that supports the CXL protocol, and the uplink ports and the downlink ports are deployed. The uplink ports are connected to the host. The host is a device that supports the PCIe protocol or the CXL protocol. The downlink ports are connected to at least one of the processor and the memory module, and the downlink ports are correspondingly connected to the uplink ports, so that the host can connect both the processor and the memory module, allowing for flexible allocation of the number of processors and the number of the memory modules according to actual needs. Therefore, a problem, in the related technologies, that resources cannot be dynamically reallocated based on different workload might be resolved, to achieve the effect of flexible allocation of the resources.

In an exemplary embodiment, there are both N uplink ports and N downlink ports, where N is a natural number greater than 1. The value of N is determined by a function of the control chip. For example, N may be 16 or 4. As shown in FIG. 2, the CXL Switch chip is equipped with a total of six uplink ports and downlink ports. In this embodiment, uplink devices and downlink devices connected might be flexibly configured by flexibly setting the value of N, implementing flexible allocation of resources.

In an exemplary embodiment, the control chip includes at least one of the following:
  a control unit, configured to control a topology of a CXL link between the uplink ports and the downlink ports, where the CXL link is used to connect the corresponding uplink ports and downlink ports;
  a management unit, configured to manage routing information between the host and at least one of the processor and the memory module; and
  a recognition unit, connected to at least one of the processor and the memory module, and is configured to recognize a protocol type supported by at least one of the processor and the memory module in the case that a connection is established between the host and at least one of the processor and the memory module.

In this embodiment, when the control chip is a chip of the CXL Switch Fabric architecture, the control unit may include a plurality of CXL Switch Fanouts. The CXL Switch Fanout means a process of copying one CXL link to a plurality of other links in the CXL Switch Fabric. This process allows a plurality of devices to simultaneously access and share devices on the same CXL link, thereby improving system performance and scalability. The control chip is capable of implementing CXL switch Fanout because the CXL supports a point-to-point topology structure, which can allow a plurality of devices to communicate with each other through the CXL link and transfer a data packet in the link. The CXL switch Fanout is mainly used to improve the connection efficiency and data throughput between a plurality of devices in the system.

The management unit may include a plurality of CXL Switch Roots, and the CXL device is connected to the CXL Switch Fabric through a CXL port. The CXL Switch Root maintains one routing table for storing and managing routing information between all nodes in the network. When a CXL device sends a data request, an optimal path is selected for the routing table to forward data to a destination CXL device, for example, transferring the data from HOST1 to the memory module for storage. A traffic manager of the CXL port in the board for CXL data transmission stores the data sequentially in a buffer for fast processing and transmission. Based on information from an input port and the routing table, the CXL Switch Fabric selects an optimal path in the buffer and forwards the data to a port of the destination CXL device. While the data is forwarded, the CXL Switch Fabric also needs to ensure the stability of a communication speed and the consistency of performance within the control chip. When the CXL device needs to return the data, the CXL Switch Fabric also finds an optimal path based on the routing information and the status of the buffer and transmits the data to a target device.

The recognition unit can use a BIOS command to recognize whether a port is connected to the PCLE device or the CXL device. For example, a CPU of an IntelEagle Stream series is used as an example of the host, and CXL interconnection relies entirely on a PCIe 5.0 electrical layer, and all topologies rely on the PCIe. The Eagle Stream CPU can support CXL4X16 channels. The CXL device and a PCI Express device can work simultaneously on a given port, with 8 lanes per device. Any x16 PCI Express port can be connected to the PCI Express device or the CXL device. The recognition unit can automatically detect whether the other end is a PCI Express board or the CXL device, and dynamically configure a link. When the CXL device is connected, a CXL mode should be set in advance in the BIOS, and the BIOS command can be used to recognize whether the port is connected to the PCLE device or the CXL device. In this embodiment, the link topology and routing information can be controlled, and a device type can be recognized by using the control chip, so that resources might be quickly allocated.

In an exemplary embodiment, there are M hosts, P processors, and K memory modules, where M, P, and K are all natural numbers greater than or equal to 1.

In this embodiment, when M is greater than 1, M hosts share K memory modules. When N is 16, M is greater than or equal to 2 and less than or equal to 7. When N is 16, M is 7, and P is 7, and the processors are in a one-to-one correspondence with the hosts, or one host is corresponding to a plurality of processors, where data is transmitted between the host and the processor through the PCIe protocol.

When K is greater than 1, one host is corresponding to a plurality of memory modules, and the plurality of memory modules form a memory resource pool for the host. Data is transmitted between the host and the memory modules through the CXL protocol, and the number of hosts is proportional to the number of memory modules. For example, in the case that a CXL 2.0 switch chip is selected as the control chip, the control chip is compatible with PCIe 5.0 and supports switching between different pieces of firmware (programs written in an erasable programmable read-only memory (EPROM) or electrically erasable programmable read-only memory (EEPROM)). The control chip is provided with a total of 16 ports, and each of the ports can be configured as PCIe or CXL, to support a scenario in which the PCIe and CXL are mixed. A minimum of two hosts and a maximum of seven hosts can be connected. When used in a high-speed computing scenario, the uplink device can be connected to seven hosts, and the downlink device can be connected to seven GPUs, with each host connected to one GPU, allowing for parallel processing of data in a plurality of channels. Alternatively, two hosts can be connected. Each host outputs 4 X16 signals, with HOST1 connected to four GPUs configured to accelerate data processing, and HOST2 connected to a 4X16 memory module configured to read and store the data. Alternatively, the uplink device can be connected to four hosts, and the downlink device can be connected to an 8X16 memory module by using the CXL protocol Two sets of X16 ports are divided for each host and are connected to two X16 memory modules.

Figure 3:
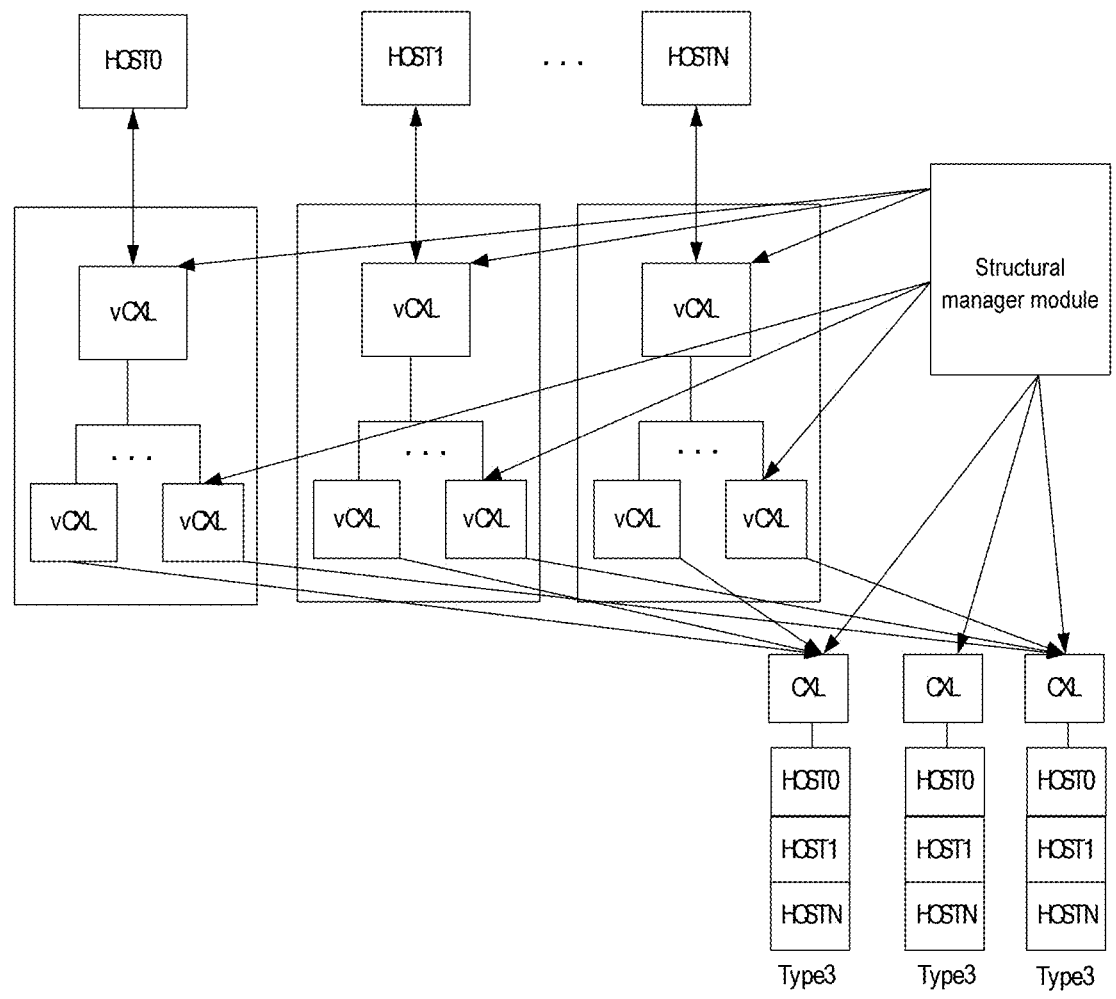
FIG. 3 is a connection diagram at a switch level according to an embodiment of this application.

In one embodiment, as shown in FIG. 3, at a switch level of the control chip, a plurality of VCXLs can be included, which can be mapped to specified physical ports based on an instruction of the host, and can support up to 16 pieces of logical storage space to be allocated. Each VCXL has its own ID, which is used to bind or unbind mapping from the VCXL to the physical port under the control of the host, implementing configuration between different ports.

The port in this embodiment can be flexibly configured based on actual needs of the application, and the number of hosts and port resource information of the host can also be flexibly configured, as shown in FIG. 3, the host includes HOST0, HOST1, and HOSTN. Therefore, the resources might be flexibly allocated.

Figure 4:
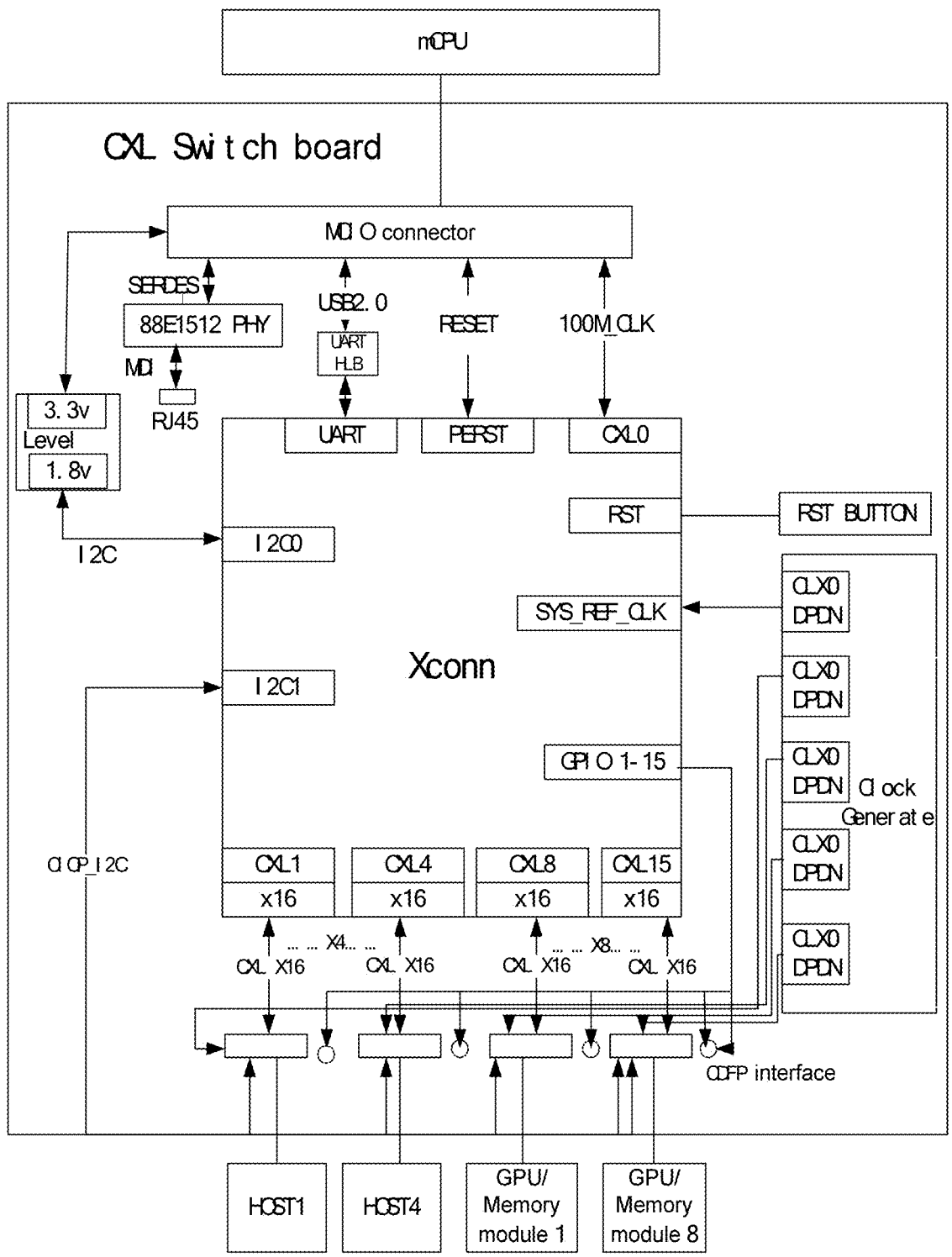
FIG. 4 is a second flowchart of a method for controlling signal transmission according to an embodiment of this application.

In an exemplary embodiment, the board for CXL data transmission further includes a connector, connecting the control chip and a manager, where the manager is configured to manage the operation of the control chip through the connector. In this embodiment, the connector may be a cable component connector MCIO(Mini Cool Edge I/O). As shown in FIG. 2, the CXL Switch chip is connected to an external manager CPU(mCPU) through the connector MCIO. As shown in FIG. 4, the manager CPU manages an I2C(I2C0 and I2C1), RESET, status indication, and the like of the CXL Switch chip. SERDES is the abbreviation for Serializer/Deserializer, 88E1512 PHY is a physical chip, UART HLB is the abbreviation for Universal Asynchronous Receiver/Transmitter High-Level Bus, RST BUTTON is the abbreviation for Reset Button, PERST is the abbreviation for Power On Reset, DPDN is the abbreviation for Power Down, SYS_REF_CLK is the abbreviation for System Reference Clock, GPIO(GPIO 1-15) is the abbreviation for General Purpose Input/Output, CIOP(CIOP 12C) is the abbreviation for Cable Interconnect for Optical Port, 100M CLK is the abbreviation for 100MHz Clock Signal. In this embodiment, the control chip is managed through an external manager, which can accurately control a working state of the control chip.

In an exemplary embodiment, the board for CXL data transmission further includes: a clock generator, where the clock generator is connected to the control chip, is configured to generate a first initialization clock signal that starts the control chip, and is configured to generate, after the control chip is started, a first clock signal that coordinates a clock frequency of the control chip. In this embodiment, the clock generator is connected to the control chip, the processor, and the memory module through a preset interface, is configured to generate second initialization clock signals for starting the control chip, the processor, and the memory module respectively, and is configured to generate, after the control chip, the processor, and the memory module are started, second clock signals that coordinates clock frequencies of the control chip, the processor, and the memory module. As shown in FIG. 4, the board for CXL data transmission supports a RJ45 interface, which is a BMC management network port. Each CDFP interface is equipped with a pair of red and green bi-color lights. Based on a clock signal generated by the clock generator, the red light remains off during normal data transmission and lights up continuously in case of a fault. The green light lights up continuously when there is no data transmission and flashes at a frequency of 1 Hz during normal data transmission. In this embodiment, data transmission might be accurately monitored by using the clock generator.

In an exemplary embodiment, the board for CXL data transmission further includes a commissioning device, and the commissioning device is connected to the control chip and is configured to perform commissioning on CXL performance of the control chip. In this embodiment, a scope of commissioning of the commissioning device includes: CXL marginal testing, which is in the same way as PCIe commissioning; a CXL link speed, width, compliance testing; and enabling or disabling a staggered mode for system stress, performance, or bandwidth testing. In addition, the scope further includes CXL compliance testing, CXL stress testing, CXL latency testing, and the like. What's more, the scope further includes link and protocol error handling, and faults are logged and displayed through the CXL.io protocol and the CXL.io protocol using PCIe ERR messages. In this embodiment, correctness of data transmission might be ensured by commissioning of the commissioning device.

Figure 5:
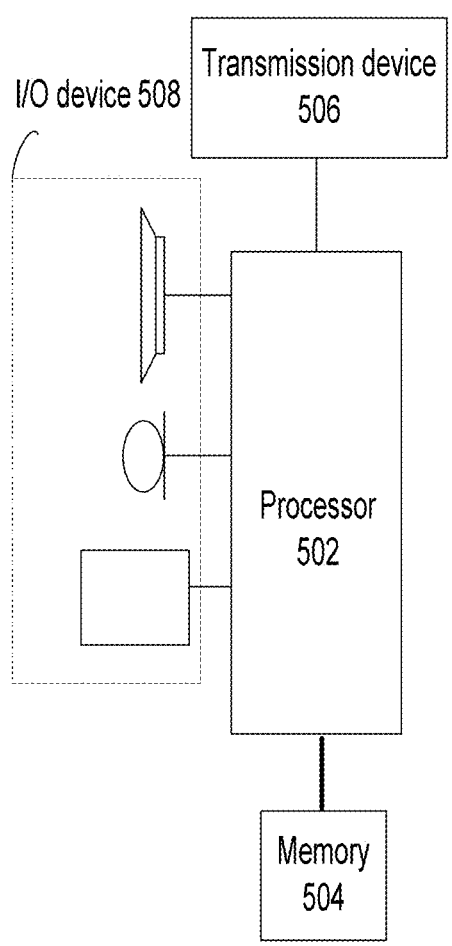
FIG. 5 is a schematic diagram for managing a control chip by an external manager according to an embodiment of this application.

A method embodiment provided in an embodiment of this application may be performed in a mobile terminal, a computer terminal, or a similar computing apparatus. For example, the method embodiment is performed on a mobile terminal. FIG. 5 is a structural block diagram of hardware of a mobile terminal for a method for data transmission control according to an embodiment of this application. As shown in FIG. 5, the mobile terminal may include one or more (only one shown in FIG. 5) processors 502 (which may include but are not limited to processing apparatuses such as a microprocessor MCU or a programmable logic device FPGA) and a memory 504 configured to store data. The mobile terminal may also include a transmission device 506 configured for communication and an input/output device 508. A person skilled in the art may understand that the structure shown in FIG. 5 is only illustrative and does not limit a structure of the mobile terminal. For example, the mobile terminal may further include more or fewer components than shown in FIG. 1 or have a different configuration as shown in FIG. 5.

The memory 504 may be configured to store a computer program, for example, a software program and a module of application software, such as a computer program corresponding to the method for data transmission control in the embodiment of this application. The processor 502 runs the computer program stored in the memory 504, to perform various function applications and data processing, that is, implement the above method. The memory 504 may include a high-speed random access memory, and may further include a non-volatile memory, such as one or more magnetic storage apparatuses, a flash memory, or another non-volatile solid-state memory. In some examples, the memory 504 may include a memory disposed remotely relative to the processor 502, and these remote memories may be connected to the mobile terminal via a network. Examples of the network include but are not limited to the Internet, an intranet, a local area network, a mobile communication network, and a combination thereof.

The transmission device 506 is configured to receive or send data via a network. An example of the network may include a wireless network provided by a communication provider of the mobile terminal. In an example, the transmission device 506 includes a network adapter (Network Interface Controller, NIC), which may be connected to another network device through a base station to communicate with the Internet. In an example, the transmission device 506 may be a radio frequency (RF) module, which is configured to communicate with the Internet wirelessly.

Figure 6:
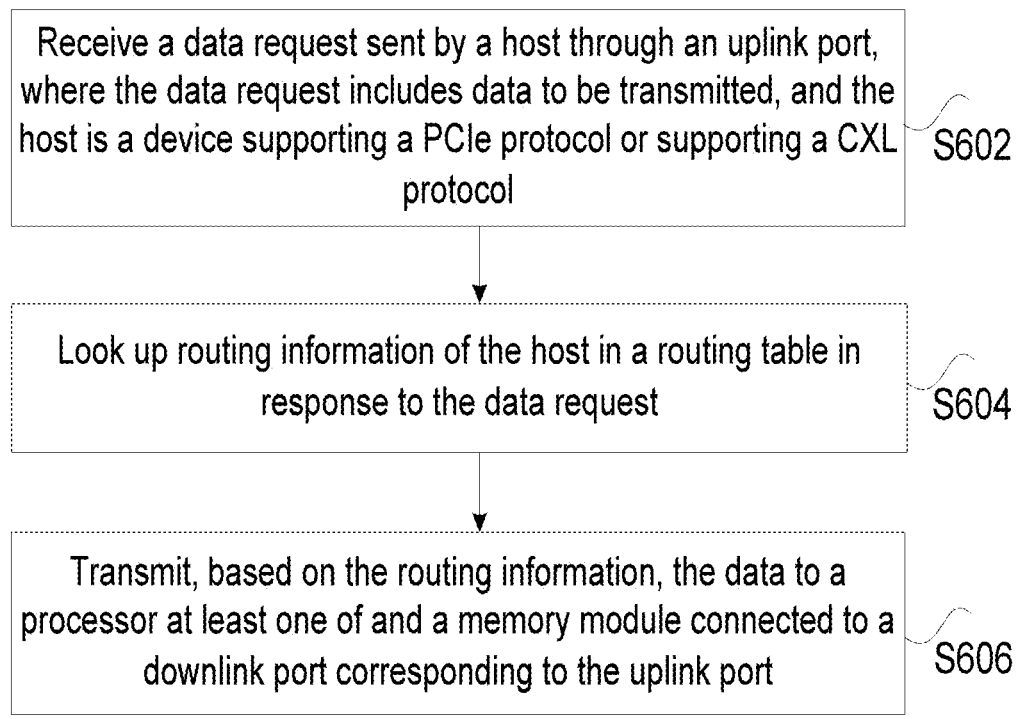
FIG. 6 is a flowchart of a method for data transmission control according to an embodiment of this application.

In this embodiment, a method for data transmission control is provided. FIG. 6 is a flowchart of the method for data transmission control according to an embodiment of this application. As shown in FIG. 6, the flow includes the following steps:

Step S602: A data request sent by a host is received through an uplink port, where the data request includes data to be transmitted, and the host is a device supporting a PCIe protocol or supporting a CXL protocol;

Step S604: Routing information of the host is looked up in a routing table in response to the data request; and Step S606: The data is transmitted, based on the routing information, to at least one of a processor and a memory module connected to a downlink port corresponding to the uplink port, where the downlink port is correspondingly connected to the uplink port, and both the processor and the memory module are devices supporting the PCIe protocol or the CXL protocol.

The above steps can be performed by a processor disposed in the control chip, or a processor or processing device independently configured with respect to the terminal or server, but is not limited to thereto.

This embodiment can be used in scenarios that require high-speed data transmission and large-scale data processing, such as a data center, high-performance computing, artificial intelligence cloud computing, and the like.

In this embodiment, the control chip is a chip that supports the CXL protocol, including a high-speed interconnect architecture CXL Switch Fabric. The CXL Switch Fabric can connect a plurality of CXL devices to form a computing platform for sharing resources. The CXL Switch Fabric provides a scalable and flexible infrastructure for the CXL devices, and a high-speed point-to-point connection is provided between the CXL devices, to implement communication and data transmission between the devices. The CXL devices may be hosts, processors, memory modules, and other devices.

In one embodiment, the CXL Switch Fabric architecture is divided into three layers: a transaction layer, a link layer, and a physical layer. To be compatible with both the PCIe protocol and the CXL protocol, a Flex Bus port is provided in the CXL Switch Fabric architecture, allowing a device to be selected from a PCIe device and a CXL device. A CXL.cache protocol and a CXL.mem protocol are combined to share a common transaction layer and a common link layer, while a CXL.io has its own transaction layer and link layer. The CXL link layer interacts with CXL ARB or MUX to interweave traffic from two logical streams. The physical layer also includes two sublayers, namely a logical sublayer and an electrical sublayer. The logical sublayer can switch between a PCIe mode and a CXL mode, while the electrical sublayer follows a PCIe specification. In the transaction layer, the CXL.io provides an inconsistent load or storage interface for an I/O device.

In one embodiment, the processor may be either a CPU or a GPU, and the CPU and GPU may not use the PCIe protocol and share each other's memory resources using the CXL protocol. Through the CXL protocol, the CPU and GPU are connected into one single massive stack memory pool. In this embodiment, a GPU BOX can support both a PCIe protocol and the CXL protocol. As shown in FIG. 2, the board for CXL data transmission may be a CXL Switch board, the control chip may be a CXL Switch chip, the processor may be a GPU, an uplink device may be connected to a plurality of HOSTs, and a downlink device may be connected to the GPU BOX or the memory module, which are flexibly configured. In addition, each host may be connected to different downlink devices, and a connection relationship between the host and the downlink device can be changed by changing programming information of the CXL Switch chip. The number of uplink devices and downlink devices connected can be determined by a function of the CXL Switch chip.

In one embodiment, when the downlink device is the GPU BOX, the GPU BOX supports 16 GPU slots, which are interconnected with the CXL Switch chip through CDFP cables, an onboard CPLD is configured to control power-on timing of the BOX, and an onboard bus master controller (BMC) is configured to manage a working state of the GPU.

In one embodiment, the memory module is a device based on the CXL bus protocol, which can implement remote expansion of the memory and memory sharing among a plurality of hosts. A CDFP interface of a memory board is interconnected with the CXL Switch board through a CDFP cable. The onboard BMC and CPLD are responsible for management of a CXL Switch board, including heat dissipation control, power on/off, status indication, and the like.

After the above steps are performed, the control chip in the board for CXL data transmission is a chip that supports the CXL protocol, and the uplink ports and the downlink ports are deployed. The uplink ports are connected to the host. The host is a device that supports the PCIe protocol or the CXL protocol. The downlink ports are connected to at least one of the processor and the memory module, and the downlink ports are correspondingly connected to the uplink ports, so that the host can connect both the processor and the memory module, allowing for flexible allocation of the number of processors and the number of the memory modules according to actual needs. Therefore, a problem, in the related technologies, that resources cannot be dynamically reallocated based on different workload might be resolved, to achieve the effect of flexible allocation of the resources.

In an exemplary embodiment, there are both N uplink ports and N downlink ports, where N is a natural number greater than 1. There are both N uplink ports and N downlink ports, where N is a natural number greater than 1. The value of N is determined by a function of the control chip. For example, N may be 16 or 4. As shown in FIG. 2, the CXL Switch chip is equipped with a total of six uplink ports and downlink ports. In this embodiment, uplink devices and downlink devices connected can be flexibly configured by flexibly setting the value of N, implementing flexible allocation of resources.

In an exemplary embodiment, before routing information of the host is looked up in a routing table in response to the data request, the method further includes: a topology of a CXL link is controlled between N uplink ports and N downlink ports, where the CXL link is configured to connect the corresponding uplink ports and downlink ports; and a rout between the host and at least one of the processor and memory module is determined based on the topology of the CXL link, to obtain the routing table. The data is transmitted, based on the routing information, to at least one of a processor and a memory module connected to a downlink port corresponding to the uplink port, which includes: the data is cached into a cache unit through the downlink port; a target route is selected from the routing information; and the data in the cache unit is transmitted, based on the target route, to at least one of the processor and memory module connected to the downlink port.

In this embodiment, when the control chip is a chip of the CXL Switch Fabric architecture, the control unit may include a plurality of CXL Switch Fanouts. The CXL Switch Fanout means a process of copying one CXL link to a plurality of other links in the CXL Switch Fabric. This process allows a plurality of devices to simultaneously access and share devices on the same CXL link, thereby improving system performance and scalability. The control chip is capable of implementing CXL switch Fanout because the CXL supports a point-to-point topology structure, which can allow a plurality of devices to communicate with each other through the CXL link and transfer a data packet in the link. The CXL switch Fanout is mainly used to improve the connection efficiency and data throughput between a plurality of devices in the system. The CXL device is connected to the CXL Switch Fabric through a CXL port. The CXL Switch Root maintains one routing table for storing and managing routing information between all nodes in the network. When a CXL device sends a data request, an optimal path is selected for the routing table to forward data to a destination CXL device, for example, transferring the data from HOST1 to the memory module for storage. A traffic manager of the CXL port in the board for CXL data transmission stores the data sequentially in a buffer for fast processing and transmission. Based on information from an input port and the routing table, the CXL Switch Fabric selects an optimal path in the buffer and forwards the data to a port of the destination CXL device. While the data is forwarded, the CXL Switch Fabric also needs to ensure the stability of a communication speed and the consistency of performance within the control chip. When the CXL device needs to return the data, the CXL Switch Fabric also finds an optimal path based on the routing information and the status of the buffer and transmits the data to a target device.

In an exemplary embodiment, before the data is transmitted, based on the routing information, to at least one of a processor and a memory module connected to a downlink port corresponding to the uplink port, the method further includes: in the case that a connection is established between the host and at least one of the processor and memory module, a protocol type supported by at least one of the processor and the memory module is recognized, so that the data is transmitted to the protocol type supported by at least one of the processor and the memory module based on the protocol type supported by at least one of the processor and memory module. In this embodiment, a BIOS command is used to recognize whether a port is connected to the PCLE device or the CXL device. For example, a CPU of an IntelEagle Stream series is used as an example of the host, and CXL interconnection relies entirely on a PCIe 5.0 electrical layer, and all topologies rely on the PCIe. The Eagle Stream CPU can support CXL4X16 channels. The CXL device and a PCI Express device can work simultaneously on a given port, with 8 lanes per device. Any x16 PCI Express port can be connected to the PCI Express device or the CXL device. The recognition unit can automatically detect whether the other end is a PCI Express board or the CXL device, and dynamically configure a link. When the CXL device is connected, a CXL mode should be set in advance in the BIOS, and the BIOS command can be used to recognize whether the port is connected to the PCLE device or the CXL device. In this embodiment, the link topology and routing information can be controlled, and a device type can be recognized by using the control chip, so that resources might be quickly allocated.

In an exemplary embodiment, there are M hosts, P processors, and K memory modules, where M, P, and K are all natural numbers greater than or equal to 1. When M is greater than 1, M hosts share K memory modules. When N is 16, M is greater than or equal to 2 and less than or equal to 7. When N is 16, M is 7, and P is 7, and the processors are in a one-to-one correspondence with the hosts, or one host is corresponding to a plurality of processors, where data is transmitted between the host and the processor through the PCIe protocol.

For example, in the case that a CXL 2.0 switch chip is selected as the control chip, the control chip is compatible with PCIe 5.0 and supports switching between different pieces of firmware (programs written in an erasable programmable read-only memory (EPROM) or electrically erasable programmable read-only memory (EEPROM)). The control chip is provided with a total of 16 ports, and each of the ports can be configured as PCIe or CXL, to support a scenario in which the PCIe and CXL are mixed. A minimum of two hosts and a maximum of seven hosts can be connected. When used in a high-speed computing scenario, the uplink device can be connected to seven hosts, and the downlink device can be connected to seven GPUs, with each host connected to one GPU, allowing for parallel processing of data in a plurality of channels. Alternatively, two hosts can be connected. Each host outputs 4 X16 signals, with HOST1 connected to four GPUs configured to accelerate data processing, and HOST2 connected to a 4X16 memory module configured to read and store the data. Alternatively, the uplink device can be connected to four hosts, and the downlink device can be connected to an 8X16 memory module by using the CXL protocol Two sets of X16 ports are divided for each host and are connected to two X16 memory modules.

In one embodiment, as shown in FIG. 3, at a switch level of the control chip, a plurality of VCXLs can be included, which can be mapped to specified physical ports based on an instruction of the host, and can support up to 16 pieces of logical storage space to be allocated. Each VCXL has its own ID, which is used to bind or unbind mapping from the VCXL to the physical port under the control of the host, implementing configuration between different ports.

The port in this embodiment can be flexibly configured based on actual needs of the application, and the number of hosts and port resource information of the host can also be flexibly configured. Therefore, the resources might be flexibly allocated.

In an exemplary embodiment, when K is greater than 1, one host is corresponding to a plurality of memory modules, and the plurality of memory modules form a memory resource pool for the host. Data is transmitted between the host and the memory modules through the CXL protocol, and the number of hosts is proportional to the number of memory modules.

Based on the descriptions of the foregoing implementations, a person skilled in the art may clearly understand that the method based on the above embodiments may be implemented by software in addition to a required universal hardware platform or by hardware only. In most circumstances, the former is a preferred implementation. Based on such understanding, the technical solutions of this application essentially, or the part contributing to related technologies may be reflected in a form of a software product. The computer software product is stored in a non-volatile readable storage medium (for example, a ROM/RAM, a magnetic disk, or an optical disc), and includes several instructions for instructing a terminal device (which may be a mobile phone, a computer, a server, a network device, or the like) to perform the method described in the embodiments of this application.

In this embodiment, a control system for link switching is also provided, including the above board for CXL data transmission. This board is configured to implement the above embodiments and optional implementations, which are not described herein again.

An embodiment of this further provides a non-volatile-readable storage medium. The non-volatile-readable storage medium stores a computer program, and when the computer is set to run, the steps in any of the above method embodiments are performed.

In an exemplary embodiment, the non-volatile-readable storage medium may include, but is not limited to: a USB flash disk, a read-only memory (ROM), a random access memory (RAM), a mobile hard disk drive, a magnetic disk, an optical disk, or any other non-volatile-readable storage medium that can store a computer program.

An embodiment of this application further provides an electronic device, including a memory and a processor. A computer program is stored in the memory, and the processor is configured to run the computer program, so that the steps in any of the above method embodiments are performed.

Figure 7:
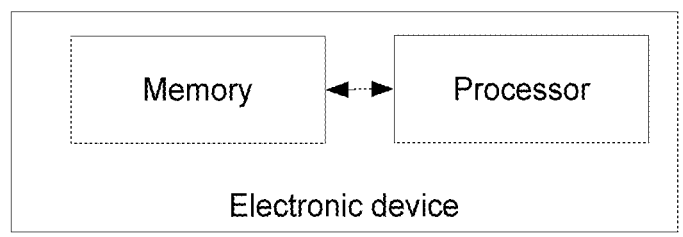
FIG. 7 is a schematic diagram of an electronic device according to an embodiment of this application.

An embodiment of this application further provides an electronic device. FIG. 7 is a schematic diagram of the electronic device according to an embodiment of this application, including a memory and a processor. A computer program is stored in the memory, and the processor is configured to run the computer program, so that the steps in any of the above method embodiments are performed.

In an exemplary embodiment, the electronic device may further include a transmission device and an I/O device, where the transmission device is connected to the above processor, and the I/O device is connected to the processor.

For an example in this embodiment, reference may be made to the example described in the above embodiment and exemplary implementation, which is not described herein again.

Obviously, it should be understood by a person skilled in the art that the above modules or steps in this application can be implemented by a general computing apparatus, may be concentrated on a single computing apparatus or distributed on a network including a plurality of computing apparatuses, and may be implemented by program code executable by the computing apparatus, so that the above modules or steps may be stored in a storage apparatus and implemented by the computing apparatus. In addition, in some cases, the steps shown or described may be performed in a different order herein, or may be made into individual integrated circuit modules, or a plurality of the modules or steps may be made into a single integrated circuit module for implementation. In this manner, this application is not limited to any particular combination of hardware and software.

The foregoing descriptions are merely optional embodiments of this application, but are not intended to limit this application. Persons skilled in the art understand that this application may have various modifications and variations. Any modification, equivalent replacement, and improvement made within the principle of this application shall fall within the protection scope of this application.

What is claimed is:

1. A board for Compute Express Link (CXL) data transmission, comprising:
   a control chip, wherein the control chip is a chip that supports an open interconnection standard CXL protocol, and uplink ports and downlink ports are deployed on the control chip;
   the uplink ports, connected to a host, wherein the host is a device that supports a Peripheral Component Interconnect Express (PCIe) protocol or a device that supports the CXL protocol; and
   the downlink ports, connected to at least one of a processor and a memory module, wherein the downlink ports are correspondingly connected to the uplink ports, and the host is configured to transmit data to the corresponding downlink ports through the uplink ports, to transmit the data to at least one of the processor and the memory module through the downlink ports,
   wherein both the processor and the memory module are devices that support the PCIe protocol or the CXL protocol;
   wherein a SWITCH level of the control chip comprises a plurality of virtual CXLs, the virtual CXLs are configured to map to specified physical ports in the control chip based on instructions from the host, to perform configurations between different uplink ports and different downlink ports, and
   wherein the configurations between different uplink ports and different downlink ports are corresponding to configurations between different numbers of processors and different numbers of memory modules.

2. The board for CXL data transmission according to claim 1, wherein there are both N uplink ports and N downlink ports, and wherein N is a natural number greater than 1.

3. The board for CXL data transmission according to claim 2, wherein the control chip comprises a control unit, configured to control a topology of a CXL link between the uplink ports and the downlink ports, and wherein the CXL link is configured to connect the corresponding uplink ports and downlink ports.

4. The board for CXL data transmission according to claim 2, wherein the control chip comprises:
   a management unit, configured to manage routing information between the host and at least one of the processor and the memory module.

5. The board for CXL data transmission according to claim 2, wherein there are M hosts, P processors and K memory modules, and wherein M, P, and K are all natural numbers greater than or equal to 1.

6. The board for CXL data transmission according to claim 5, wherein when M is greater than 1, M hosts share K memory modules, or
   wherein N is 16, and M is greater than or equal to 2 and less than or equal to 7; or
   wherein N is 16, M is 7, and P is 7, and the processors are in a one-to-one correspondence with the hosts, or one host is corresponding to a plurality of processors, and wherein data is transmitted between the host and the processor through the PCIe protocol.

7. The board for CXL data transmission according to claim 5, wherein in response to K being greater than 1, one host is corresponding to a plurality of memory modules, and the plurality of memory modules form a memory resource pool for the host, wherein data is transmitted between the host and the memory modules through the CXL protocol, and wherein the number of hosts is proportional to the number of memory modules.

8. The board for CXL data transmission according to claim 1, wherein the control chip comprises:
   a recognition unit, connected to at least one of the processor and the memory module, and is configured to recognize a protocol type supported by at least one of the processor and the memory module in the case that a connection is established between the host and at least one of the processor and the memory module.

9. The board for CXL data transmission according to claim 1, further comprising:
   a connector, connecting the control chip and a manager, wherein the manager is configured to manage the operation of the control chip through the connector.

10. The board for CXL data transmission according to claim 1, further comprising:
    a clock generator, wherein the clock generator is connected to the control chip, is configured to generate a first initialization clock signal that starts the control chip, and is configured to generate, after the control chip is started, a first clock signal that coordinates a clock frequency of the control chip.

11. The board for CXL data transmission according to claim 10, wherein the clock generator is connected to the control chip, the processor, and the memory module through a preset interface, is configured to generate second initialization clock signals for starting the control chip, the processor, and the memory module respectively, and is configured to generate, after the control chip, the processor, and the memory module are started, second clock signals that coordinates clock frequencies of the control chip, the processor, and the memory module.

12. The board for CXL data transmission according to claim 10, further comprising:
   a commissioning device, wherein the commissioning device is connected to the control chip and is configured to perform commissioning on CXL performance of the control chip.

13. A method for data transmission control, comprising:
   receiving a data request sent by a host through an uplink port, wherein the data request comprises data to be transmitted, and the host is a device supporting a Peripheral Component Interconnect Express (PCIe) protocol or supporting a Compute Express Link (CXL) protocol;
   looking up routing information of the host in a routing table in response to the data request; and
   transmitting, based on the routing information, the data to at least one of a processor and a memory module connected to a downlink port corresponding to the uplink port, wherein the downlink port is correspondingly connected to the uplink port, and both the processor and the memory module are devices supporting the PCIe protocol or the CXL protocol;
   wherein a SWITCH level of the control chip comprises a plurality of virtual CXLs, the virtual CXLs are configured to map to specified physical ports in the control chip based on instructions from the host, to perform configurations between different uplink ports and different downlink ports, and
   wherein the configurations between different uplink ports and different downlink ports are corresponding to configurations between different numbers of processors and different numbers of memory modules, the control chip is a chip that supports the open interconnection standard CXL protocol, and uplink ports and downlink ports are deployed on the control chip.

14. The method according to claim 13, wherein there are both N uplink ports and N downlink ports, wherein N is a natural number greater than 1, and wherein before the looking up routing information of the host in a routing table in response to the data request, the method further comprises:
   setting a topology of a CXL link between N uplink ports and N downlink ports wherein the CXL link is used to connect the corresponding uplink ports and the downlink ports; and
   determining a route between the host and at least one of the processor and the memory module based on the topology of the CXL link, to obtain the routing table.

15. The method according to claim 13, wherein the transmitting, based on the routing information, the data to at least one of a processor and a memory module connected to a downlink port corresponding to the uplink port comprises:
   caching the data into a cache unit through the downlink port;
   selecting a target route from the routing information; and
   transmitting, based on the target route, the data in the cache unit to at least one of the processor and memory module connected to the downlink port.

16. The method according to claim 13, wherein before the transmitting, based on the routing information, the data to at least one of a processor and a memory module connected to a downlink port corresponding to the uplink port, the method further comprises:
   in the case that a connection is established between the host and at least one of the processor and memory module, recognizing a protocol type supported by at least one of the processor and the memory module, so that the data is transmitted to the protocol type supported by at least one of the processor and the memory module based on the protocol type supported by at least one of the processor and memory module.

17. The method according to claim 13, wherein there are M hosts, P processors, and K memory modules, and wherein M, P, and K are all natural numbers greater than or equal to 1.

18. The method according to claim 17, wherein when M is greater than 1, M hosts share K memory modules; or
   wherein N is 16, and M is greater than or equal to 2 and less than or equal to 7, wherein N is the number of the uplink ports or the downlink ports, and N is a natural number greater than 1; or
   wherein N is 16, M is 7, and P is 7, and the processors are in a one-to-one correspondence with the hosts, or one host is corresponding to a plurality of processors, and wherein data is transmitted between the host and the processor through the PCIe protocol, N is the number of the uplink ports or the downlink ports, and N is a natural number greater than 1.

19. The method according to claim 17, wherein in response to K being greater than 1, one host is corresponding to a plurality of memory modules, and the plurality of memory modules form a memory resource pool for the host, wherein data is transmitted between the host and the memory modules through the CXL protocol, and wherein the number of hosts is proportional to the number of memory modules.

20. An electronic device, comprising a memory, a processor, and a computer program stored in the memory and runnable on the processor, wherein when the processor executes the computer program, the following actions are implemented:
   receiving a data request sent by a host through an uplink port, wherein the data request comprises data to be transmitted, and the host is a device supporting a Peripheral Component Interconnect Express (PCIe) protocol or supporting a Compute Express Link (CXL) protocol;
   looking up routing information of the host in a routing table in response to the data request; and
   transmitting, based on the routing information, the data to at least one of a processor and a memory module connected to a downlink port corresponding to the uplink port, wherein the downlink port is correspondingly connected to the uplink port, and both the processor and the memory module are devices supporting the PCIe protocol or the CXL protocol;
   wherein a SWITCH level of the control chip comprises a plurality of virtual CXLs, the virtual CXLs are configured to map to specified physical ports in the control chip based on instructions from the host, to perform configurations between different uplink ports and different downlink ports, and
   wherein the configurations between different uplink ports and different downlink ports are corresponding to configurations between different numbers of processors and different numbers of memory modules, the control chip is a chip that supports the open interconnection standard CXL protocol, and uplink ports and downlink ports are deployed on the control chip.

* * * * *